US008058208B2

(12) United States Patent
Murray et al.

(10) Patent No.: US 8,058,208 B2
(45) Date of Patent: Nov. 15, 2011

(54) PROCESS FOR PREPARING MOLECULARLY IMPRINTED POLYMER ION EXCHANGE RESINS

(75) Inventors: George M. Murray, Columbia, MD (US); Kelly A. Van Houten, West Friendship, MD (US); Glen E. Southard, Park City, UT (US)

(73) Assignee: The Johns Hopkins University, Baltimore, MD (US)

( * ) Notice: Subject to any disclaimer, the term of this patent is extended or adjusted under 35 U.S.C. 154(b) by 896 days.

(21) Appl. No.: 12/089,027

(22) PCT Filed: Aug. 11, 2006

(86) PCT No.: PCT/US2006/031346
§ 371 (c)(1),
(2), (4) Date: Apr. 2, 2008

(87) PCT Pub. No.: WO2007/055767
PCT Pub. Date: May 18, 2007

(65) Prior Publication Data
US 2008/0264868 A1      Oct. 30, 2008

Related U.S. Application Data

(60) Provisional application No. 60/736,376, filed on Nov. 14, 2005.

(51) Int. Cl.
*B01J 21/04*      (2006.01)

(52) U.S. Cl. .................. 502/439; 502/402; 502/526

(58) Field of Classification Search ............... 502/401, 502/402, 439, 526
See application file for complete search history.

(56) References Cited

U.S. PATENT DOCUMENTS 6,127,311 A    10/2000    Davankov et al.
6,416,487 B1    7/2002    Braverman et al.

OTHER PUBLICATIONS

S. Durie et al., One-Pot Synthesis of Branched Poly(styrene-divinylbenzene) Suspension Polymerized Resins, Macromolecules 2002, 35, 9665-9672.
Glen E. Southard et al., Synthesis of Vinyl-substituted B-Diketones for Polymerizable Metal Complexes, JOC Note, J. Org. Chem. 2005, 70, 9036-9039.

*Primary Examiner* — Edward Johnson
(74) *Attorney, Agent, or Firm* — Noah J. Hayward

(57) ABSTRACT

A molecularly imprinted polymer ion exchange resin for selectively removing one or more inorganic ions in a liquid medium is disclosed and described. The exchange resin can include a bead having a porous structure and comprising a cross-linked molecularly imprinted polymer having molecular sized cavities adapted to selectively receive and bind a specific inorganic ion in a liquid medium. A process for preparing a molecularly imprinted polymer ion exchange resin can include (a) polymerizing a polmerizable mixture in the presence of an inorganic ion imprinting complex to form a bead, said inorganic ion imprinting complex including a ligand and an inorganic ion; and (b) removing the inorganic ions from the bead to form the molecularly imprinted polymer ion exchange resin, the bead having a porous structure and comprising a cross-linked molecularly imprinted polymer having molecular sized cavities adapted to selectively receive and bind a specific inorganic ion in an liquid medium.

13 Claims, 1 Drawing Sheet

PROCESS FOR PREPARING MOLECULARLY IMPRINTED POLYMER ION EXCHANGE RESINS

CROSS-REFERENCE TO RELATED APPLICATIONS

This application claims the benefit of prior filed U.S. Provisional Application No. 60/736,376, filed Nov. 14, 2005, and entitled "THE PREPARATION OF MOLECULARLY IMPRINTED POLYMER ION-EXCHANGE RESIN BEADS AND THEIR USE AS SEQUESTERING AGENTS FOR TOXIC OR ECONOMICALLY USEFUL IONS", the contents of which are incorporated by reference herein.

BACKGROUND OF THE INVENTION

1. Field of the Invention

The present invention generally relates to molecularly imprinted polymer ion exchange resins, a process for their preparation and their use as a sequestering agent for the removal of one or more inorganic ions from a liquid medium.

2. Description of the Related Art

Various levels of water purity may be required for different end uses. Water quality may be regulated by various government agencies and trade organizations including the U.S. Environmental Protection Agency (EPA) and the Food and Drug Administration (FDA). Purified water is used in many industries including the chemical, foodstuffs, electronics, power, medical and pharmaceutical industries, as well as for human consumption. Typically, prior to use in any one of these fields, the water is treated to reduce the level of contaminants to acceptable levels. These treatment techniques include, for example, coagulation, disinfection, distillation, filtration, ion exchange, reverse osmosis, photooxidation, ozonation, and combinations thereof.

Disinfection units are typically used to reduce the concentration of viable microorganisms in a water supply. This may be accomplished by adding a disinfectant such as chlorine, ozone, hypochlorite, hypobromite or ammonia directly to the water supply so that pathogenic organisms are destroyed. Alternatively, microorganisms may be destroyed by a process, such as heating or treatment with ultraviolet light, or microorganisms may be physically removed from the water by filtration. When a chemical disinfectant is used, it is often desirable to remove the disinfectant from the water prior to consumption, and this may be accomplished in a number of ways including chemical neutralization and removal by filtration.

Filtration is used to remove suspended matter from a water supply but may also aid in the removal of dissolved or colloidal species. Filters may be structured from a variety of materials including particulate matter such as sand, diatomaceous earth, or granular activated carbon (GAC), or may be based on a membrane that may be composed of a number of different materials including polymers and fibrous materials. Filters typically work by preventing the passage of suspended material while allowing water to pass through. One way of rating a filter is by its "pore size" which provides information as to what size particle will be retained by the filter. Some methods, such as hyperfiltration, may have pore sizes small enough to exclude some dissolved species.

Water may be adversely affected by the presence of calcium or magnesium ions. Known as "hardness," a high concentration of these cations, typically more than 200 ppm (mg/L as $CaCO_3$), results in a water that may leave scale or other deposits on equipment and piping. Typically, calcium and magnesium are removed from water (softened) by exchanging the calcium and magnesium ions for alternative cations, often sodium. Water softeners typically contain resin beads that exchange two sodium ions for every calcium or magnesium ion that is removed from the treated water. Periodically, the water softener may be recharged to resupply the resin beads with an adequate supply of sodium or alternative cations.

Reverse osmosis (RO) is a filtration technique that provides for the removal of dissolved species from a water supply. Typically, water is supplied to one side of an RO membrane at elevated pressure and purified water is collected from the low pressure side of the membrane. The RO membrane is structured so that water may pass through the membrane while other compounds, for example, dissolved ionic species, are retained on the high pressure side. Some species however, such as bicarbonate, may not be retained. The "concentrate" that contains an elevated concentration of ionic species may then be discharged or recycled, while the permeate, typically containing a reduced concentration of ionic species, is collected for later use.

Deionization units may also be used to remove a variety of ionic species from a water supply. Deionization units typically employ either chemical or electrical deionization to replace specific cations and anions with alternative ions. In chemical deionization, an ion exchange resin is employed to replace ions contained in the feed water. The ions on the resin are recharged by periodically passing a recharging fluid through the resin bed. This fluid may be an acid that replenishes the supply of hydrogen ions on the cation exchange resin. For anion exchange resins, the resin may be replenished by passing a base through the resin, replacing any bound anions with hydroxyl groups and preparing the resin for additional anion removal.

The currently available technologies such as those discussed above require expensive equipment, large amounts of power, and are expensive to maintain. Other approaches, such as dilution with fresh water, are impractical over the long run.

Accordingly, there remains a need for systems and methods for removing contaminants from a liquid medium such as waste waters.

BRIEF DESCRIPTION OF THE DRAWINGS

Various embodiments are described below with reference to the drawings wherein.

DETAILED DESCRIPTION OF PREFERRED EMBODIMENT(S)

Figure 1:
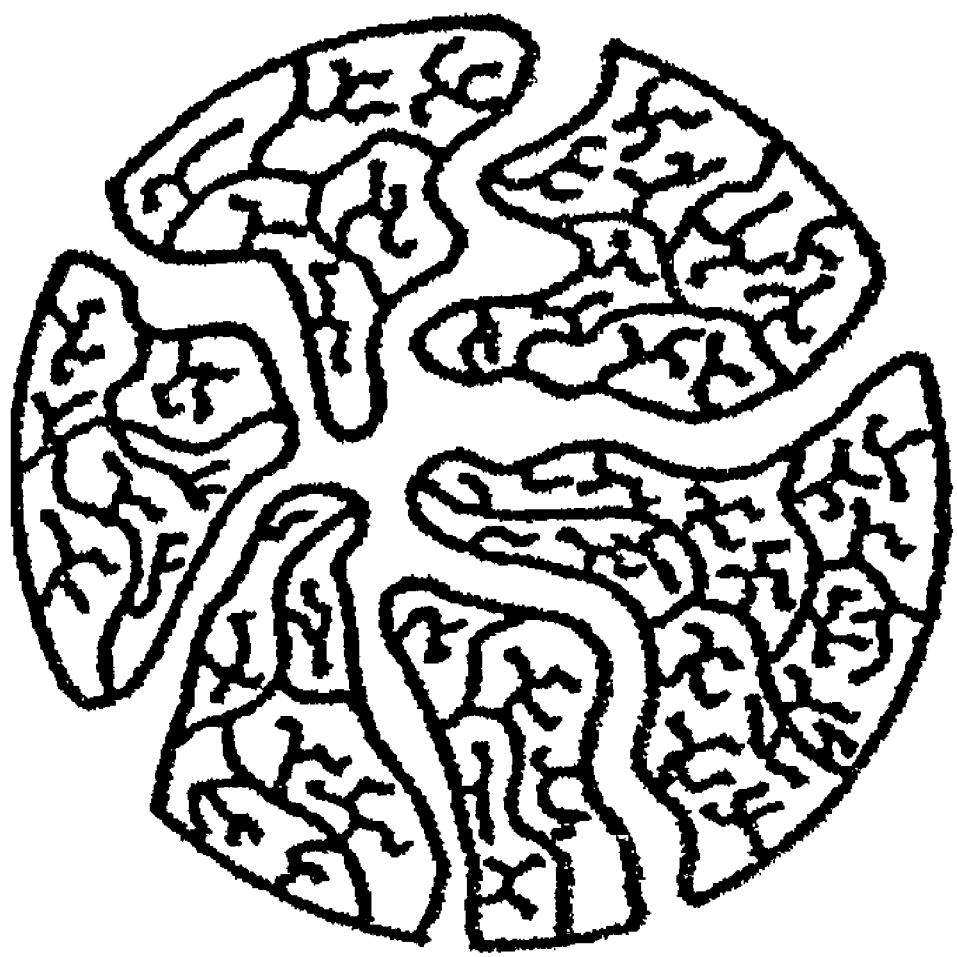
FIG. 1 is a graphic illustration of the polymer matrix of the cross-linked molecularly imprinted polymer bead having a macroporous structure according to one embodiment of the present invention.

The present invention is directed to a process and system for removing one or more inorganic ions present in a liquid medium, e.g., drinking water, lakes, streams, industrial effluent, mine waste streams, etc, employing a cross-linked molecularly imprinted polymer ion exchange resin. The present invention uses techniques of molecularly imprinting polymers for providing a selective binding site in an ion exchange resin for receiving cations and anions. Ion exchange resin systems of the present invention can include a plurality of the same or different beads each having a porous structure of at least a cross-linked molecularly imprinted polymer ("MIP") having molecular sized cavities adapted to selectively receive and bind specific inorganic ion(s) that are present in the aqueous medium. The cavities advantageously direct the specific cation or anion to a selective binding site. Transport of ions through the ion exchange resin system of the present invention can be used for separating, removing, or recovering the captured inorganic ions, and is often driven by environmental, economic, health, and medical concerns.

Molecularly imprinted polymers (MIPs) can be made by building an imprinting complex of a target inorganic ion and associated attached binding molecules that possess the ability to be incorporated into a polymer, e.g. via a polymerizable group or an appropriate reactive functional group. The complex is usually dissolved in a larger amount of other polymerizable molecules. The bulk of the other molecules of the polymer are made with crosslinking monomers. These molecules have two places to bind to the polymer chain to form a rigid three-dimensional structure. The crosslinkers are generally necessary to hold the complexing molecules or ligands in place after the target molecule (also called a "template", "analyte" or "taggant") is removed. Once removed, the ligands remain fixed in place to form cavities which are specifically sized and oriented to receive the target molecule. The target molecule to be removed in the present invention can include one or more inorganic ions present in a liquid medium. Examples of such inorganic ions include (d) and (f) block cations, e.g., manganese cations, zinc cations, chromium cations, precious metal cations, and the like; (p) block or main group cations, e.g. lead cations, thallium, tin, antimony, and the like; oxyanions, e.g., arsenate anions, molybdate anions, phosphate anions, nitrate anions, and the like. In another embodiment, the inorganic ions are metal ions. In yet another embodiment, the inorganic ions can include or consist essentially of oxyanions or (p) block cations. Although the inorganic ions can most often be present in an aqueous medium, the materials and methods of the present invention can be applied in the removal of inorganic ions from organic liquids (e.g. petroleum oils, organic solvents, and the like) and ionic liquids (e.g. molten salts such as butyl imidazole, tetrafluoroborate, 1-butyl-3-methylimidazolium salts or bmim, 1-alkylpyridinium salts, N-methyl-N-alkylpyrrolidinium salts, ammonium salts, and the like with room temperature ionic liquids being preferred among the ionic liquids).

The terms "molecularly imprinted polymer" and "MIP" as used herein refer to a polymer structure that includes complexing molecules or ligands which are imprinted to selectively bind to a specific ion whether or not such ions are present. The polymer structure has organized interactive moieties complementary to the spacing of binding sites on the target imprint inorganic ion. Interactive moieties can include functional groups or ligands. The geometrical organization of the interactive moieties imparts selective binding characteristics for the target inorganic ion within the molecularly imprinted polymer. The selective binding interactions refer to preferential and reversible binding exhibited by the MIP for an ion (anion or cation), as described herein.

For example, the term "complex" as used herein can refer to a coordination compound formed by the union of a lanthanide or other metal ion with a non-metallic ion or molecule referred to herein as a ligand or complexing molecule. The combination of an inorganic ion with a ligand is referred to herein as an imprinting complex. The ligands for use in the MIP herein can be the same or a mixture of ligands and are known in the art. Ligands are molecules that include moieties which enter into a coordination bond with a metal atom or other target inorganic ion, for example, a transition metal atom, such as nickel or iron, or a lanthanide rare earth metal atom, for example, lanthanum. The term "bidentate" as used herein refers generally to a ligand offering two groups of atoms or ions for attachment to the central target ion in a chelate composition. This may involve charge center development, but not to the extent that the bond is ionic in nature. Thus, there is considerable covalent character to a ligand/metal bond. Bidentate ligands have two sites on the ligand that form coordination bonds to a metal center which, by virtue of the geometric arrangement of the atoms comprising the ligand, can occupy two coordination sites on a single metal atom simultaneously. Suitable bidentate ligands for use in the present invention include, but are not limited to vinylbenzoate, vinyl-β-diketones, acrylamidophenanthroline, and phosphate ligands. Ligands can be selected based on their thermodynamic affinity for a specific metal ion versus an affinity for competing metal ions.

It is important to distinguish ligands that have two monodentate coordination sites on the ligand from those which have two coordination sites arranged such that they can participate in a bidentate binding interaction. For example, 2,2' bipyridine is bidentate (the nitrogen atom of each pyridine ring is adjacent to the carbon bonded to the other ring) and therefore the nitrogen atoms are geometrically situated such that they can coordinate to two separate coordination sites on a single transition metal atom simultaneously, but 4,4' bipyridine (the nitrogen atoms of each pyridine ring are opposite to the carbon bonded to the other ring) is not bidentate, because, although each nitrogen atom can coordinate to a separate coordination site on two different transition metals at the same time, they cannot both simultaneously coordinate to two different coordination sites on the same transition metal.

In one embodiment, a ligand L of the lanthanide complex can be a β-diketone having the following structure:

$$R^1-C(O)-CR^2_2-C(O)-R^3$$

wherein $R^1$ is a hydrocarbon group having 1 to about 20 carbons and containing a chain transfer moiety; $R^2$ can be the same or different and is hydrogen or a hydrocarbon group having from 1 to about 12 carbon atoms and $R^3$ is a straight or branched chain alkyl group of 1 to about 12 carbon atoms optionally containing one or more halogen atoms.

In one embodiment, the hydrocarbon group of $R^1$ is a substituted or unsubstituted alkyl group; a cycloalkyl group; a substituted or unsubstituted aryl group, e.g., a phenyl group, a naphthyl group and the like; a substituted or unsubstituted alkaryl group, e.g., 2-methylphenyl group (o-tolyl group), thenoyl, 3-methylphenyl group (m-tolyl group), 4-methylphenyl group (p-tolyl group), 2,3-dimethylphenyl group (2,3-xylyl group), 3,4-dimethylphenyl group (3,4-xylyl group), 2,4,6-trimethylphenyl group (mesityl group) and the like; a substituted or unsubstituted aralkyl group, e.g., phenylmethyl group (benzyl group), phenylethyl group (phenethyl group), triphenylmethyl group (trityl group) and the like; a substituted or unsubstituted monocyclic aromatic group, e.g., benzene, methylbenzene (toluene), 1,2-dimethylbenzene (o-xylene), 1,3-dimethylbenzene (m-xylene), 1,4-dimethylbenzene (p-xylene), 1,3,5-trimethylbenzene (mesitylene), 1,2,3-trimethylbenzene, 1,2,4-trimethylbenzene, tetramethylbenzene, pentamethylbenzene, ethylbenzene, n-propylbenzene, isopropylbenzene (cumene), 1-isopropyl-4-methylbenzene (p-cymene), n-butylbenzene, 2-butylbenzene, isobutylbenzene, tert-butylbenzene, n-pentylbenzene, cyclopentylbenzene, neopentylbenzene, cyclohexylbenzene, 1-cyclohexyl-4-methylbenzene, cyclooctylbenzene and the like; a substituted or unsubstituted polycyclic aromatic hydrocarbon group, e.g., biphenyl, biphenylene, terphenyl, naphthalene, azulene, anthracene, phenanthrene, triphenylene, pyrene, 1-methylnaphthalene, 2-methylnaphthalene, 1-ethylnaphthalene, 2-ethylnaphthalene, 2,21-dimethylbiphenyl, diphenylethane, 1,2-diphenylethane, 1,8-diphenyloctane and the like, or combinations thereof.

Useful chain transfer moieties include, but are not limited to, dithiocarboxylic ester groups (—S—C(S)R) wherein R is a hydrocarbon group having from 1 to about 20 carbon atoms, including by way of example, straight or branched aliphatic, cycloaliphatic and aromatic groups and cycloaliphatic and aromatic groups substituted with one or more straight or branched aliphatic, cycloaliphatic and/or aromatic groups; trithiocarbamates; benzyl iodides; hydroxyl groups (—OH), ketone groups, alkoxy groups (—OR), carboxyl groups (—COOH), ester groups (—COOR), aldehyde group (—CHO), acyl groups (—C(O)R), amide groups (—C(O)NH$_2$), substituted amide groups (—C(O)NHR), —C(O)NR$_2$), amino groups (—NH$_2$), substituted amino groups (—NHR, —NR$_2$), nitro groups (—NO$_2$), nitroso groups (—NO), unsubstituted and substituted cyano groups (—CN), cyanate groups (—OCN), isocyanate groups (—NCO), thiocyanate groups (—SCN), isothiocyanate group (—NCS), thiol group (—SH), and the like.

In another embodiment of the present invention, one $R^2$ is hydrogen and the other $R^2$ is an alkyl of 1 to 6 carbon atoms. In another embodiment, $R^3$ is an alkyl halide group of the formula (-($R^4$)$_t$CX$_3$) wherein $R^4$ is a hydrocarbon group of 1 to about 12 carbon atoms, t is 0 or 1 and X is a halide, e.g., Cl, F, Br, I with F being preferred. In another embodiment, $R^3$ is the same as $R^1$.

In another embodiment of the present invention, ligand L can be a fluorinated β-diketone having the structure:

$$R^1—C(O)—CH_2—C(O)—CF_3$$

wherein $R^1$ is a hydrocarbon group having from 1 to about 20 carbon atoms and includes a chain transfer moiety. The chain transfer moiety preferably includes a dithiocarboxylic ester (e.g., RC(S)—S—) functionality wherein R has the aforestated meaning; a trithiocarbonate and/or a benzyl iodide. Preferably, $R^1$ is an aromatic group such as benzene and/or naphthalene groups.

The lanthanide elements, also known as the rare earth elements, consist of the elements having atomic numbers from 57 to 71. As used herein, the term "lanthanide" refers to the following elements of the periodic table: lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

For example, an imprinting complex can be formed by reacting about three moles of ligand (the same ligand or mixed ligands) with about one mole of lanthanide halide such as EuCl$_3$. This reaction is generally carried out in an aqueous solution in the presence of an alkali hydroxide (e.g., NaOH). The ligand is preferably first dissolved in a solvent such as tetrahydrofuran (THF) or acetone, and the reaction is terminated by the addition of an alcohol (e.g., methanol) or by cooling to room temperature. The precipitated complex is extracted by filtration with further purification, such as recrystallization or column chromatography. The imprint complex is then ready for polymerization. Representative examples of an inorganic ion imprinting complex for use herein include, but are not limited to, manganese(II) bis(5-vinylthenoyltrifluoroacetone), EuL$_3$ wherein L is a bidentate ligand containing a polymerizable group as described hereinabove, zinc(II) acrylate, lead(II) vinylbenzo ate, N-(4-vinylbenzyl)-N-decyl-N,N-dimethyl arsenate, and the like. Methods for preparing such complexes are well known in the art and need not be discussed in detail herein.

A wide variety of monomers may be used for synthesizing the MIP in accordance with the principles of the present invention. Suitable non-limiting examples of monomers that can be used for preparing a MIP of the present invention include methylmethacrylate, other alkyl methacrylates, alkylacrylates, allyl or aryl acrylates and methacrylates, cyanoacrylate, styrene, methyl styrene, vinyl esters, including vinyl acetate, vinyl chloride, methyl vinyl ketone, vinylidene chloride, acrylamide, methacrylamide, acrylonitrile, methacrylonitrile, 2-acetamido acrylic acid; 2-(acetoxyacetoxy)ethyl methacrylate 1-acetoxy-1,3-butadiene; 2-acetoxy-3-butenenitrile; 4-acetoxystyrene; acrolein; acrolein diethyl acetal; acrolein dimethyl acetal; acrylamide; 2-acrylamidoglycolic acid; 2-acrylamido-2-methyl propane sulfonic acid; acrylic acid; acrylic anhydride; acrylonitrile; acryloyl chloride; (R)-acryloxy,dimethyl-g-butyrolactone; N-acryloxy succinimide-acryloxytris(hydroxymethyl) aminomethane; N-acryloyl chloride; N-acryloyl pyrrolidinone; N-acryloyl-tris(hydroxymethyl)amino methane; 2-amino ethyl methacrylate; N-(3-aminopropyl)methacrylamide; (o, m, or p)-amino-styrene; t-amyl methacrylate; 2-(1-aziridinyl) ethyl methacrylate; 4-benzyloxy-3-methoxystyrene; 2-bromoacrylic acid; 4-bromo-1-butene; 3-bromo-3,3-difluoropropane; 6-bromo-1-hexene; 3-bromo-2-methacrylonitrile; 2-(bromomethyl)acrylic acid; 8-bromo-1-octene; 5-bromo-1-pentene; cis-1-bromo-1-propene; bromostyrene; p-bromostyrene; bromotrifluoro ethylene; (±)-3-buten-2-ol; 1,3-butadiene; 1,3-butadiene-1,4-dicarboxylic acid 3-butenal diethyl acetal; 1-butene; 3-buten-2-ol; 3-butenyl chloroformate; 2-butylacrolein; t-butylacrylamide; butyl acrylate; butyl methacrylate; (o,m,p)-bromostyrene; t-butyl acrylate; (R)-carvone; (S)-carvone; (−)-carvyl acetate; cis 3-chloroacrylic acid; 2-chloroacrylonitrile; 2-chloroethyl vinyl ether; 2-chloromethyl-3-trimethylsilyl-1-propene; 3-chloro-1-butene; 3-chloro-2-chloromethyl-1-propene; 3-chloro-2-methyl propene; 2,2-bis(4-chlorophenyl)-1,1-dichloroethylene; 3-chloro-1-phenyl-1-propene; m-chlorostyrene; o-chlorostyrene; p-chlorostyrene; 1-cyanovinyl acetate; 1-cyclopropyl-1-(trimethylsiloxy)ethylene; 2,3-dichloro-1-propene; 2,6-dichlorostyrene; 1,3-dichloropropene; 2,4-diethyl-2,6-heptadienal; 1,9-decadiene; 1-decene; 1,2-dibromoethylene; 1,1-dichloro-2,2-difluoroethylene; 1,1-dichloropropene; 2,6-difluorostyrene; dihydrocarveol; (±)-dihydrocarvone; (−)-dihydrocarvyl acetate; 3,3-dimethylacrylaldehyde; N,N'-dimethylacrylamide; 3,3-dimethylacrylic acid; 3,3-dimethylacryloyl chloride; 2,3-dimethyl-1-butene; 3,3-dimethyl-1-butene; 2-dimethyl aminoethyl methacrylate; 1-(3-butenyl)-4-vinylbenzene; 2,4-dimethyl-2,6-heptadien-1-ol; 2,4-dimethyl-2,6-heptadienal; 2,5-dimethyl-1,5-hexadiene; 2,4-dimethyl-1,3-pentadiene; 2,2-dimethyl-4-pentenal; 2,4-dimethylstyrene; 2,5-dimethylstyrene; 3,4-dimethylstryene; 1-dodecene; 3,4-epoxy-1-butene; 2-ethyl acrolein; ethyl acrylate; 2-ethyl-1-butene; (±)-2-ethylhexyl acrylate; (±)-2-ethylhexyl methacrylate; 2-ethyl-2-(hydroxymethyl)-1,3-propanediol triacrylate; 2-ethyl-2-(hydroxymethyl)-1,3-propanediol trimethacrylate; ethyl methacrylate; ethyl vinyl ether; ethyl vinyl ketone; ethyl vinyl sulfone; (1-ethylvinyl)tributyl tin; m-fluorostyrene; o-fluorostyrene; p-fluorostyrene; glycol methacrylate (hydroxyethyl methacrylate); 1,6-heptadiene; 1,6-heptadienoic acid; 1,6-heptadien-4-ol; 1-heptene; 1-hexen-3-ol; 1-hexene; hexafluoropropene; 1,6-hexanediol diacrylate; 1-hexadecene; 1,5-hexadien-3,4-diol; 1,4-hexadiene; 1,5-hexadien-3-ol; 1,3,5-hexatriene; 5-hexen-1,2-diol; 5-hexen-1-ol; hydroxypropyl acrylate; 3-hydroxy-3,7,11-trimethyl-1,6,10-dodecatriene; isoamyl methacrylate; isobutyl methacrylate; isoprene; 2-isopropenylaniline; isopropenyl chloroformate;

4,4'-isopropylidene dimethacrylate; 3-isopropyl-a-a-dimethylbenzene isocyanate; isopulegol; itaconic acid; itaconalyl chloride; (±)-linalool; linalyl acetate; p-mentha-1,8-diene; p-mentha-6,8-dien-2-ol; methyleneamino acetonitrile; methacrolein; [3-(methacryloylamino)-propyl]trimethylammonium chloride; methacrylamide; methacrylic acid; methacrylic anhydride; methacrylonitrile; methacryloyl chloride; 2-(methacryloyloxy)ethyl acetoacetate; (3-methacryloxypropyl) trimethoxy silane; 2-(methacryloxy)ethyl trimethyl ammonium methylsulfate; 2-methoxy propene (isopropenyl methyl ether); methyl-2-(bromomethyl)acrylate; 5-methyl-5-hexen-2-one; methyl methacrylate; N,N'-methylene bisacrylamide; 2-methylene glutaronitrite; 2-methylene-1,3-propanediol; 3-methyl-1,2-butadiene; 2-methyl-1-butene; 3-methyl-1-butene; 3-methyl-1-buten-1-ol; 2-methyl-1-buten-3-yne; 2-methyl-1,5-heptadiene; 2-methyl-1-heptene; 2-methyl-1-hexene; 3-methyl-1,3-pentadiene; 2-methyl-1,4-pentadiene; (±)-3-methyl-1-pentene; (±)-4-methyl-1-pentene; (±)-3-methyl-1-penten-3-ol; 2-methyl-1-pentene; -methyl styrene; t-methylstyrene; 3-methylstyrene; methyl vinyl ether; methyl vinyl ketone; methyl-2-vinyloxirane; 4-methylstyrene; methyl vinyl sulfone; 4-methyl-5-vinylthiazole; myrcene; t-nitrostyrene; 3-nitrostyrene; 1-nonadecene; 1,8-nonadiene; 1-octadecene; 1,7-octadiene; 7-octene-1,2-diol; 1-octene; 1-octen-3-ol; 1-pentadecene; 1-pentene; 1-penten-3-ol; t-2,4-pentenoic acid; 1,3-pentadiene; 1,4-pentadiene; 1,4-pentadien-3-ol; 4-penten-1-ol; 4-penten-2-ol; 4-phenyl-1-butene; phenyl vinyl sulfide; phenyl vinyl sulfonate; 2-propene-1-sulfonic acid sodium salt; phenyl vinyl sulfoxide; 1-phenyl-1-(trimethylsiloxy)ethylene; propene; safrole; styrene (vinyl benzene); 4-styrene sulfonic acid sodium salt; styrene sulfonyl chloride; 3-sulfopropyl acrylate potassium salt; 3-sulfopropyl methacrylate sodium salt; tetrachloroethylene; tetracyano ethylene; trans 3-chloroacrylic acid; 2-trifluoromethyl propene; 2-(trifluoromethyl)propenoic acid; 2,4,4'-trimethyl-1-pentene; 3,5-bis(trifluoromethyl)styrene; 2,3-bis(trimethylsiloxy)-1,3-butadiene; 1-undecene; vinyl acetate; vinyl acetic acid; 4-vinyl anisole; 9-vinyl anthracene; vinyl behenate; vinyl benzoate; vinyl benzyl acetate; vinyl benzyl alcohol; 3-vinyl benzyl chloride; 3-(vinyl benzyl)-2-chloroethyl sulfone; 4-(vinyl benzyl)-2-chloroethyl sulfone; N-(p-vinyl benzyl)-N,N'-dimethyl amine; 4-vinyl biphenyl (4-phenyl styrene); vinyl bromide; 2-vinyl butane; vinyl butyl ether; 9-vinyl carbazole; vinyl carbinol; vinyl cetyl ether; vinyl chloroacetate; vinyl chloroformate; vinyl crotanoate; vinyl cyclohexane; 4-vinyl-1-cyclohexene; 4-vinylcyclohexene dioxide; vinyl cyclopentene; vinyl dimethylchlorosilane; vinyl dimethylethoxysilane; vinyl diphenylphosphine; vinyl 2-ethyl hexanoate; vinyl 2-ethylhexyl ether; vinyl ether ketone; vinyl ethylene; vinyl ethylene iron tricarbonyl; vinyl ferrocene; vinyl formate; vinyl hexadecyl ether; vinylidene fluoride; 1-vinyl imidizole; vinyl iodide; vinyl laurate; vinyl magnesium bromide; vinyl mesitylene; vinyl 2-methoxy ethyl ether; vinyl methyl dichlorosilane; vinyl methyl ether; vinyl methyl ketone; 2-vinyl naphthalene; 5-vinyl-2-norbornene; vinyl pelargonate; vinyl phenyl acetate; vinyl phosphonic acid, bis(2-chloroethyl)ester; vinyl propionate; 4-vinyl pyridine; 2-vinyl pyridine; 1-vinyl-2-pyrrolidinone; 2-vinyl quinoline; 1-vinyl silatrane; vinyl sulfone; vinyl sulfonic acid sodium salt; o-vinyl toluene; p-vinyl toluene; vinyl triacetoxysilane; vinyl tributyl tin; vinyl trichloride; vinyl trichlorosilane; vinyl trichlorosilane (trichlorovinylsilane); vinyl triethoxysilane; vinyl triethylsilane; vinyl trifluoroacetate; vinyl trimethoxy silane; vinyl trimethyl nonylether; vinyl trimethyl silane; vinyl triphenyphosphinium bromide (triphenyl vinyl phosphonium bromide); vinyl tris-(2-methoxyethoxy) silane; vinyl 2-valerate and the like; and mixtures thereof.

Acrylate-terminated or otherwise unsaturated urethanes, carbonates, and epoxies can also be used in the MIP. An example of an unsaturated carbonate is allyl diglycol carbonate. Unsaturated epoxies include, but are not limited to, glycidyl acrylate, glycidyl methacrylate, allyl glycidyl ether, and 1,2-epoxy-3-allyl propane.

Crosslinking agents that impart rigidity or structural integrity to the MIP are known to those skilled in the art. The MIP must have sufficient rigidity so that the target ion may be easily removed without affecting the integrity of the polymer. In such cases where the polymer matrix is insufficiently rigid, crosslinking or other hardening agents can be introduced. Examples of suitable crosslinking agents include, but are not limited to, di- tri- and tetrafunctional acrylates or methacrylates, divinylbenzene (DVB), alkylene glycol and polyalkylene glycol diacrylates and methacrylates, including ethylene glycol dimethacrylate (EGDMA) and ethylene glycol diacrylate, vinyl or allyl acrylates or methacrylates, divinylbenzene, diallyldiglycol dicarbonate, diallyl maleate, diallyl fumarate, diallyl itaconate, vinyl esters such as divinyl oxalate, divinyl malonate, diallyl succinate, triallyl isocyanurate, the dimethacrylates or diacrylates of bis-phenol A or ethoxylated bis-phenol A, methylene or polymethylene bisacrylamide or bismethacrylamide, including hexamethylene bisacrylamide or hexamethylene bismethacrylamide, di(alkene) tertiary amines, trimethylol propane triacrylate, pentaerythritol tetraacrylate, divinyl ether, divinyl sulfone, diallyl phthalate, triallyl melamine, 2-isocyanatoethyl methacrylate, 2-isocyanatoethylacrylate, 3-isocyanatopropylacrylate, 1-methy:L-2-isocyanatoethyl methacrylate, 1,1-dimethyl-2-isocyanaotoethyl acrylate, tetraethylene glycol diacrylate, tetraethylene glycol dimethacrylate, triethylene glycol diacrylate, triethylene glycol dimethacrylate, hexanediol dimethacrylate, hexanediol diacrylate, 1,3-divinyltetramethyl disiloxane; 8,13-divinyl-3,7,12,17-tetramethyl-21H,23H-porphine; 8,13-divinyl-3,7,12,17-tetramethyl-21H,23H-propionic acid; 8,13-divinyl-3,7,12,17-tetramethyl-21H,23H-propionic acid disodium salt; 3,9-divinyl-2,4,8,10-tetraoraspiro [5,5]undecane; divinyl tin dichloride and the like.

The choice of monomer and cross-linking agent will be dictated by the chemical (hydrophilicity, chemical stability, degree of cross-linking, ability to graft to other surfaces, interactions with other molecules, etc.) and physical (porosity, morphology, mechanical stability, etc.) properties desired for the polymer. The amounts of inorganic ion imprinting complex, monomer and crosslinking agents should be chosen to provide a crosslinked polymer exhibiting the desired structural integrity, porosity and hydrophilicity. The amounts can vary broadly, depending on the specific nature/reactivities of the complex, monomer and crosslinking agent chosen as well as the specific application and environment in which the polymer will ultimately be employed. The relative amounts of each reactant can be varied to achieve desired concentrations of complexes in the polymer support structure. Typically, the amount of complex will be on the order of about 0.01 mmol to about 100 mmol percent of monomer. The degree of crosslinking may, however, affect the amount of flux, i.e., a lower degree of crosslinking may provide a higher flux, and can affect the selectivity of the imprinted ion resins. The degree of cross-linking herein can range from about 1% to about 95%, and preferably from about 5% to about 80%. Further, an increase in dendritic pore formation can be achieved by using suitable chain transfer agents such as, but not limited to, PVA, boric acid, dialkyl ethers, and combinations thereof.

The ion exchange resins of the present invention can be prepared by various polymerization techniques. As a general matter, the inorganic ion imprinting complex can be prepared. A polymer matrix can then be formed via a suitable polymerization technique in the presence of the inorganic ion imprinting complex to form an imprinted resin. The resin product can be then be recovered. Non-limiting examples of suitable polymerization techniques can include, aqueous suspension polymerization, inverse suspension polymerization (e.g. in perfluorocarbon), non-aqueous dispersion polymerization, two-stage swelling polymerization, aerosol polymerization, latex seeded emulsion polymerization, and bulk polymerization on porous bead substrates. Currently, the aqueous suspension polymerization of a copolymerizable mixture of an organic phase containing matrix monomer, an optional cross-linker, and inorganic ion imprinting complex, and an aqueous phase containing at least one or more thixotropic agents is preferred. The thixotropic agents are optional in some cases; however, their use can significantly improve control of bead formation and substantially uniform bead or particle size. Suitable thixotropic agents employed herein are dependent on the type and amount of monomer employed and the suspending medium. The thixotropic agents typically used in conventional suspension polymerizations are advantageously employed herein. As one skilled in the art will readily appreciate, the thixotropic agents can also advantageously act as suspension agents during the suspension polymerization process. Representative examples of such thixotropic agents include, but are not limited to, cellulose ethers such hydroxyethylcellulose, (commercially available under the trade name of "CELLOSIZE"), cross-linked polyacrylic acid known under the name of "CARBOPOL" polyvinyl alcohols known under the trade name of "RHODOVIOL", boric acid, gums such as xanthum gum and the like and mixtures thereof. The amount of thixotropic agents can influence the size of the ion exchange resin (i.e., the use of larger amounts of thixotropic agents often results in the formation of smaller ion exchange resin particles). The amount of the thixotropic agents is generally from about 1.5 to about 5 weight percent, based on the weight of the monomers in the monomer mixture, and preferably from about 1.5 to about 2.5 weight percent, based on the weight of the monomers in the monomer mixture.

In the suspension polymerization procedure, the various phases can be thoroughly mixed separately prior to the start of the reaction and then added to the polymerization reaction vessel. While this mixing of the ingredients can be done in a vessel apart from the reaction vessel, the mixing can alternatively be conducted in the polymerization reaction vessel under an inert atmosphere, particularly where the monomers being employed are subjected to oxidation. Further, in order to improve yields and selectivity of the final resin product, the ligand can preferably by hydrolytically stable under polymerization conditions and in the final product. For example, the ligand can be hydrolytically stable in a suspension polymerization formulation and under a water treatment environment such that hydrolysis is substantially avoided during polymerization and the useful life of the resin.

Polymerization proceeds at an elevated temperature, preferably above about 50° C. in the presence of an optional initiator. Suitable initiators that can be used in the present invention include benzoyl peroxide, diacetylperoxide, and azo-bisisobutyronitrile (AIBN). The amount of initiator employed is within the range of about 0.005 to about 1.00% by weight, based on the weight of the monomer being polymerized. In the presence of an initiator, the temperature of reaction is maintained above that at which the initiator becomes active. Lower temperatures, e.g. about −30° C. to about 200° C., can be employed if high energy radiation is applied to initiate polymerization.

Proper and sufficient agitation or stirring is required throughout the polymerization in order to produce the spherical and porous beads having the desired size. Thus, the polymerization mixture is agitated to disperse the monomers in the reaction medium by shear action, thereby forming droplets. These droplets should be of such size that when transformed into polymer beads, which are spherical, and porous, the same will be of the desired size as discussed hereinabove. Various means are available to maintain the proper agitation. When polymerization is conducted in a reactor made of stainless steel, such reactor is preferably fitted with a rotatable shaft having one or more agitator blades. When a round-bottom flask is used as a reactor, an overhead stirrer can agitate the reaction medium. The amount of agitation necessary to obtain the desired results will vary depending upon the particular monomers being polymerized, as well as the particular polymer bead size desired. Therefore, the agitation speed such as the rpm (revolutions per minute) must be regulated within certain limits. Polymerization times can vary from about 3 hours to about 24 hours, depending on the reactivity of the monomers.

When polymerization is complete, the target ion is removed from the crosslinked polymer. Removal of the target molecule leaves a bead having a porous structure with complementary molecular cavities therein which include, for example, lanthanide-based ligands, that have specific binding affinity for the target molecule. See FIG. 1. The target molecule comprising, for example, a lead cation, may be dissociated from the inorganic ion complex binding site within the polymer in a manner that does not adversely affect the imprinted cavity. In embodiments wherein the target molecule is covalently bound to the functional monomer, any appropriate method can be used to cleave the covalent bond, although the covalent bond formed should preferably be cleaved under conditions suitable to release the imprint molecule after the MIP is formed, without adversely affecting the selective binding characteristics of the MIP. To accomplish this, acetone, isopropanol, methanol or other suitable organic solvent may be used to swell the resultant polymers, allowing greater access to the coordinated metal ions because imprinted resins have a relatively low amount of functionalization and are primarily nonionic matrices. The covalent bond that is cleaved to release the imprint molecule can optionally provide an additional polar or ionic site for design and imprinting of the imprint molecule. In preferred embodiments wherein the target molecule is associated with the ligand in a non-covalent manner, the non-covalently bound molecule can be simply leached or washed out after polymerization.

Subsequent to manufacture of the MIP ion exchange resins, the resin can be prepared as a salt for shipping and/or storage prior to use. For example, arsenate templated resins can be shipped as a chloride salt and can be regenerated by a suitable solution such as hydrochloric acid solution or sodium chloride solution. Similarly, metal templated resins can be shipped as a sodium salt. Most often the MIP ion exchange resins of the present invention can be reused more than once and frequently more than about four to five times, depending on the particular resin and the treated liquid medium. Regeneration can be accomplished in much the same manner as removal of the original imprint ion, e.g. leaching or washing with an appropriate solution. A heavily contaminated industrial waste water stream may require frequent replacement, while filtration of a potable water stream can allow for extended use and multiple regeneration cycles.

The molecularly imprinted polymer ion exchange resin of the present invention can be prepared in simple, cost effective manner by way of a one pot reaction, i.e. using a single reaction vessel. In this manner, additional reagents are avoided as well as the use of fewer steps in forming the resin. This can facilitate industrial and large scale production of the molecularly imprinted polymer ion exchange resins of the present invention. Although porous bead substrates or multiple layer composite bead structures can be formed, the ion exchange resins of the present invention can preferably be substantially homogeneous in composition throughout the bead. Specifically, the resin can be formed such that the polymer matrix and attached imprinted ligands are substantially the only materials in the beads.

The ion exchange resin thus obtained is in the form of porous beads. Porous beads can have an open cell structure such that the majority of open volumes within the bead are interconnected with one another and external openings on surfaces of the bead. In one currently preferred embodiment, the ion exchange resin can be in the form of macroporous beads. However, in some cases mesoporous or microporous beads can also be formed and can be useful for some applications. For example, depending on the target ions a microporous or mesoporous structure can be desirable as long as diffusion through the pores does not become a rate limiting step. As used herein, the term "macroporous" refers to porous networks having average pore diameters of greater than 100 nm. The term "mesoporous" refers to porous networks having an average pore diameter from 10 nm to 100 nm. Similarly, the term "microporous" refers to porous networks having an average pore diameter less than 10 nm. The resin beads of the present invention typically have a permanent porous structure even in the dry state. Although the resins can swell when contacted with a solvent, swelling is not needed to allow access to the interior of the particles through the porous structure. In contrast, gel-type resins do not have a permanent porous structure in the dry state as in the resins of the present invention, but must be swollen by a suitable solvent to allow access to the interior of the particles. In general, the ion exchange resins of the present invention may have an average particle size of from about 100 microns to about 1300 microns and preferably from about 300 microns to about 1000. In one embodiment, the ion exchange resins of the present invention may have an average particle size distribution in which 97% of the particles have a particle diameter greater than or equal to about 250 microns and less than or equal to about 841 microns. The average particle size of the ion exchange resin may be measured by various analytical methods generally known in the art including, for example, ASTM D 1921-06.

According to another aspect of the invention, the target ions are removed from an aqueous solution, collected, and reused in another application.

The molecularly imprinted polymer ion exchange resin of the present invention is particularly useful in removing contaminants from an aqueous medium, e.g., drinking water, lakes, streams, irrigation runoff, industrial effluent, mine waste, etc. The resin can be utilized in a molecularly imprinted polymer ion exchange resin system where a plurality of the same or different resins are employed. In one aspect, a plurality MIP ion exchange resin types can be combined to treat a particular liquid. For example, a combination of lead imprinted beads and arsenate imprinted beads can be combined in a single treatment system. Alternatively, a single resin material can be templated using multiple imprinting complexes. In this manner, more than one specific ion can be removed from the aqueous medium to provide a more efficient process. Generally, the liquid medium can be passed through a column or bed of the resin. Sufficient resin should be used to remove all of the undesirable inorganic ions that can be removed using the process of this invention.

The following examples are provided to enable one skilled in the art to practice the invention and are merely illustrative of the invention. The examples should not be read as limiting the scope of the invention as defined in the claims.

EXAMPLE 1

Preparation of the Ligand, VTTFA

Step 1

Synthesis of 5-bromothenoyltrifluoroacetone: Ethyltrifluoroacetate (6.91 g, 49 mmol) was added dropwise to an ether (10 mL) solution containing sodium methoxide (2.8 g, 52 mmol) which formed a slurry. The 5-bromo-2-acetylthiophene (10 g, 49 mmol) was added to the slurry in several large additions and the solution was allowed to stir for 18 hours. The solution was diluted with additional ether (50 mL) and was washed with 1 M hydrochloric acid (2×50 mL). The ethereal solution was dried over magnesium sulfate, filtered and the solvent removed. The 5-bromothenoyltrifluoroacetone could was separated from the unreacted 2-bromothiophene by vacuum distillation (150° C., 2 torr) or be isolated by forming the copper bis(diketonate) from a methanolic solution of the raw β-diketone and cupric chloride. The first band collected resulted in a yellow powder (7.4 g, 50% yield) upon solvent removal. $^1$H-NMR (200 MHz, CDCl$_3$): δ 7.70 (d, J=4 Hz, 1 H), 7.14 (d, J=4 Hz, 1 H), 6.33 (s, 2H).

Step 2

Synthesis of VTTFA: 1,4-Dioxane (40 mL), tri-t-butylphosphine (0.182 g, 0.9 mmol), and methyldicyclohexylamine (19.5 g, 100 mmol) were placed into a Schlenk flask and transferred by syringe to a PPI LC series 300 mL reactor containing dipalladium tris(dibenzylidenelacetone) (0.420 g, 0.45 mmol) and 5-bromothenoyltrifluoroacetone (9 g, 30 mmol) The reactor was charged to 300 psi with ethylene and the reaction was allowed to stir for 48 hours at room temperature. Upon completion of the reaction the contents taken up in water (50 mL) and ether (50 mL), the aqueous phase acidified by addition of concentrated hydrochloric acid, and extracted with ether (2×50 mL). The combined organic phase was rinsed with saturated sodium chloride solution, and the organic phase was dried over magnesium sulfate overnight. The solution was filtered, the solvent was removed by vacuum, and the residue dissolved in chloroform (3 mL). The product was isolated by column chromatography from silica gel (Selecto, mesh size 63-200) with 10% ether in chloroform as eluent. The solvent was removed to give a light green solid (2.4 g, 32% yield). The solid was reacted with cupric chloride dehydrate in methanol, precipitated by addition of water, and recrystallized from THF/hexanes to give (VTTFA)$_2$Cu.1.5 THF. $^1$H-NMR (90 MHz, 25° C., CDCl$_3$ free ligand): δ 14.25 (s, 1 H), 7.63 (d, 1 H), 7.12 (d, 1 H), 6.94 (dd, 1 H), 6.36 (s, 1 H), 5.86 (s, 1 H). Anal.: C 46.75 (46.88); H 3.60 (3.63).

EXAMPLE 2

Preparation of Mn(VTTFA)$_2$

VTTFA (0.10 g, 0.4 mmol) obtained in Example 1 was dissolved in 4 mL of methanol and manganese(II) chloride tetrahydrate (40 mg, 0.2 mmol) was dissolved in 2 mL of methanol. The solutions were mixed and the product was precipitated by the addition of water. The yellow precipitate was extracted into methylene chloride (10 mL), dried over $MgSO_4$, and the solvent removed in vacuo to yield 99 mg (90%) of a yellow solid.

EXAMPLE 3

Preparation of $Mn^{2+}$ Imprinted Beads

An aqueous phase was prepared by adding a solution of Xanthan Gum (Aldrich Chemical Company) (0.6 g in 150 mL of $H_2O$), a solution of Cellosize WP-40 (Aldrich Chemical Company) (0.08 g in 40 mL of $H_2O$), and a solution of boric acid (12 g in 500 mL of $H_2O$) to a flask and stirred rapidly for 2 hours. A measured volume of this mixture (125 mL) was then added to a 500 mL three neck flask. Azobis(isobutyronitrile) (AIBN) (0.063 g) was added to the 500 mL three neck flask and the mixture was purged with argon for 10 minutes. An organic phase containing divinylbenzene (4.75 g), styrene (1.50 g), methoxyethanol (6.25 mL), and $Mn(VTTFA)_2$ (0.063 g) of Example 2 was added to the flask and the organic phase was suspended as droplets by stirring at 320 rotations per minute (rpm). The mixture was purged with argon and heated to 80° C. for 5 hours to obtain 25% crosslinked polymer beads. The resulting polymer beads (5.89 g) were collected by filtration. The beads had a particle size distribution in which 97 percent of the beads had a particle diameter greater than or equal to 250 microns and less than or equal to 841 microns.

EXAMPLE 4

Preparation of Oxyanion Imprinted Beads

Step 1: Preparation of the Ligand N-(4-vinylbenzyl)-N-decyl-N,N-dimethyl Ammonium Chloride (VBzDDAC)

4-Vinylbenzyl chloride (18.60 g, 100 mmol) and N,N-dimethyl-N-decylamine (15.26 g, 100 mmol) were mixed in a 100 mL round bottomed flask. The mixture was allowed to sit overnight. The crystalline product was crushed and washed with ether. The product was collected by filtration (30.3 g, 90%)

Step 2: Preparation of N-(4-vinylbenzyl)-N-decyl-N, N-dimethyl Arsenate $(VBzDDAC)_{2-6}AsO_4$ To VBzDDAC (6.76 g, 20 mmol) of step 1 was added $Na_2HAsO_4$ (4.68 g, 15 mmol) in a mixture of 1-butanol (40 mL) and 150 mL $H_2O$ containing chloranil (0.05 g, 0.2 mmol). The reaction was stirred overnight, the organic phase was separated and the solvent was removed by vacuum. The residue was suspended in ether, filtered, and then the ether was removed to give 5 g of the product.

Step 3: Preparation of Oxyanion Beads

The aqueous phase was prepared by adding polyvinyl alcohol (14 g, 98-99% hydrolyzed, $M_w$ of 85-146K, Aldrich Chemical Company) in 700 mL distilled water. The solution was boiled gently for 1 hour and after cooling a solution of boric acid (6 g in 175 mL of $H_2O$) was added. A measured volume of this mixture (225 mL) was then added to a 2 L suspension polymerization reactor. AIBN (0.250 g) was added and the mixture was purged with Argon for 10 minutes. An organic phase containing divinylbenzene (6.125 g), styrene (18.875 g), 2-ethylhexanol (8 mL) and $(VBzDDAC)_{2-6}AsO_4$ (0.400 g) of step 2 was added to the aqueous phase. The organic phase was suspended as droplets by stirring at 320 rpm. The mixture was purged with argon and heated to 80° C. for 5 hours to obtain 25% crosslinked polymer beads. The resulting polymer beads (20.44 g) were collected by filtration. The beads had a particle size distribution in which 97 percent of the beads had a particle diameter greater than or equal to 250 microns and less than or equal to 841 microns.

EXAMPLE 5

Preparation of $Zn^{2+}$ Imprinted Beads

An aqueous phase was prepared by adding a solution of Xanthan Gum (Aldrich Chemical Company) (0.6 g in 150 mL of $H_2O$), a solution of Cellosize WP-40 (Aldrich Chemical Company) (0.08 g in 40 mL of $H_2O$), and a solution of boric acid (12 g in 500 mL of $H_2O$) to a flask and stirred rapidly for 2 hours. A measured volume of this mixture (125 mL) was then added to a 500 mL three neck flask. AIBN (0.063 g) was added and the mixture was purged with argon for 10 minutes. An organic phase containing divinylbenzene (1.50 g), styrene (4.57 g), methoxyethanol (3.18 mL), toluene (3.18 mL) and zinc acrylate, $Zn(H_2C\!=\!\!CHCO_2)_2$ (0.075 g) was added to the flask and the organic phase was suspended as droplets by stirring at 320 rpm. The mixture was purged with argon and heated to 80° C. for 5 hours to obtain 25% crosslinked polymer beads. The resulting polymer beads (5.53 g) were collected by filtration. The beads had a particle size distribution in which 97 percent of the beads had a particle diameter greater than or equal to 250 microns and less than or equal to 841 microns.

EXAMPLE 6

Preparation of $Pb^{2+}$ Imprinted Beads

An aqueous phase was prepared by adding a solution of Xanthan Gum (Aldrich Chemical Company) (0.6 g in 150 mL of $H_2O$), a solution of Cellosize WP-40 (Aldrich Chemical Company) (0.08 g in 40 mL of $H_2O$), and a solution of boric acid (12 g in 500 mL of $H_2O$) to a flask and stirred rapidly for 2 hours. A measured volume of this mixture (125 mL) was then added to a 500 mL three neck flask. AIBN (0.063 g) was added and the mixture was purged with argon for 10 minutes. An organic phase containing divinylbenzene (4.75 g), styrene (1.50 g), methoxyethanol (6.25 mL), and lead(II) vinylbenzoate, $Pb(H_2C\!=\!\!CHp-C_6H_5CO_2Me)_2$ (0.075 g) was added to the flask and the organic phase was suspended as droplets by stirring at 320 rpm. The mixture was purged with argon and heated to 80° C. for 5 hours to obtain 75% crosslinked polymer beads. The resulting polymer beads (4.38 g) were collected by filtration. The beads had a particle size distribution in which 97 percent of the beads had a particle diameter greater than or equal to 250 microns and less than or equal to 841 microns.

EXAMPLE 7

Preparation of $Zn^{2+}$ Imprinted Beads

An aqueous phase was prepared by adding a solution of Xanthan Gum (Aldrich Chemical Company) (0.6 g in 150 mL of $H_2O$), a solution of Cellosize WP-40 (Aldrich Chemical Company) (0.08 g in 40 mL of $H_2O$), and a solution of boric acid (12 g in 500 mL of $H_2O$) to a flask and stirring rapidly for 2 hours. A measured volume of this mixture (440 mL) was then added to a 2 L three neck flask. AIBN (0.248 g) was added and the mixture was purged with argon for 10 minutes. An organic phase containing divinylbenzene (19 g), styrene (6 g), methoxyethanol (12.5 mL), toluene (12.5 mL) and $Zn(H_2C=CHCO_2)_2$ (0.250 g) was added to the flask and the organic phase was suspended as droplets by stirring at 320 rpm. The mixture was purged with argon and heated to 80° C. for 5 hours to obtain 75% crosslinked polymer beads. The resulting polymer beads (24.7 g) were collected by filtration. The beads had a particle size distribution in which 97 percent of the beads had a particle diameter greater than or equal to 250 microns and less than or equal to 841 microns.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A process for preparing a molecularly imprinted polymer ion exchange resin comprising
    (a) polymerizing a polmerizable mixture in the presence of an inorganic ion imprinting complex to form a bead, said inorganic ion imprinting complex including a ligand and an inorganic ion; and
    (b) removing the inorganic ions from the bead to form the molecularly imprinted polymer ion exchange resin, the bead having a porous structure and comprising a cross-linked molecularly imprinted polymer having molecular sized cavities adapted to selectively receive and bind a specific inorganic ion in an liquid medium.

2. The process of claim 1, further comprising
    (a) providing the polymerizable mixture including an organic phase comprising a matrix monomer, an optional cross-linking agent, and an inorganic ion imprinting complex, and an aqueous phase comprising one or more thixotropic agents; and
    (b) copolymerizing the polymerizable mixture under suspension polymerization conditions to form a bead.

3. The process of claim 1, wherein the step of polymerizing under conditions of inverse suspension polymerization, non-aqueous dispersion polymerization, two-stage swelling polymerization, aerosol polymerization, or latex seeded emulsion polymerization.

4. The process of claim 1, carried out as a one-pot process.

5. The process of claim 1, wherein the matrix monomer is a styrene and the cross-linking agent is a divinylbenzene.

6. The process of claim 5, wherein the inorganic ion imprinting complex is manganese(II) bis(5-vinylthenoyltrifluoroacetone), zinc(II) acrylate, lead(II) vinylbenzoate or N-(4-vinylbenzyl)-N-decyl-N,N-dimethyl arsenate.

7. The process of claim 1, wherein the step of copolymerizing is carried out in the presence of 2,2'-azobisisonitrile (AIBN).

8. The process of claim 5, wherein the thixotropic agent is selected from the group consisting of xanthum gum, hydroxyethyl cellulose, boric acid, polyvinyl alcohol and mixtures thereof.

9. The process of claim 1, wherein the porous structure is a macroporous structure.

10. The process of claim 1, wherein the organic phase further comprises a solvent selected from the group consisting of methoxyethanol, 2-ethylhexanol, toluene and mixtures thereof.

11. The process of claim 1, wherein the bead has a diameter of about 100 microns to about 1300 microns.

12. The process of claim 1, wherein the molecular sized cavities of the cross-linked molecularly imprinted polymer are adapted to selectively receive and bind one or more of (d), (p) and (f) block cations and oxyanions.

13. The process of claim 1, wherein the molecular sized cavities of the cross-linked molecularly imprinted polymer are adapted to selectively receive and bind one or more of lead cations, zinc cations, manganese cations, arsenate anions, molybdate anions and phosphate anions.

* * * * *